United States Patent [19]

Kobayashi

[11] Patent Number: 4,970,588

[45] Date of Patent: Nov. 13, 1990

[54] VIDEO MONITORING APPARATUS WITH PLURAL INPUTS

[75] Inventor: Jun Kobayashi, Katsuta, Japan

[73] Assignee: Hitachi, Ltd., Tokyo, Japan

[21] Appl. No.: 294,674

[22] Filed: Jan. 9, 1989

[30] Foreign Application Priority Data

Jan. 14, 1988 [JP] Japan .................................. 63-4850

[51] Int. Cl.⁵ .............................................. H04N 7/18
[52] U.S. Cl. .................................... 358/108; 358/153; 358/181; 358/183
[58] Field of Search ................ 358/108, 153, 181, 183

[56] References Cited

U.S. PATENT DOCUMENTS

| 4,673,974 | 6/1987 | Ito et al. ................................. 358/108 |
| 4,713,685 | 12/1987 | Nishimura et al. ............. 358/108 X |
| 4,772,945 | 9/1988 | Tagawa et al. ...................... 358/108 |

OTHER PUBLICATIONS

Television Technique, Jan. 1987, pp. 20–24.

Primary Examiner—Howard W. Britton
Assistant Examiner—Mark R. Powell
Attorney, Agent, or Firm—Antonelli, Terry, Stout & Kraus

[57] ABSTRACT

Analog-to-digital converters of an image processor dealing with multiple input video signals are each provided with a sync separation circuit for extracting the sync signal from the input video signal and a frequency divider which is reset by the sync signal and adapted to reduce the clock frequency. The frequency dividers have an equal reduction ratio and equal clock, and produce sampling clocks used for the analog-to-digital conversion.

7 Claims, 4 Drawing Sheets

VIDEO MONITORING APPARATUS WITH PLURAL INPUTS

BACKGROUND OF THE INVENTION

This invention relates to an image processor capable of displaying the images of video signals from a plurality of signal sources on the same screen at the same time.

There have been known display systems, such as monitoring systems, in which a plurality of video cameras are installed and moving pictures are reproduced from the video camera signals. An image memory is used, for example, for display so that the pictures are displayed simultaneously in small sections of the same screen. An example of this image processor is described in the publication "Television Technique", pp. 20-24, January 1987. The following explains the image processor in brief with reference to FIGS. 1 and 2. In the block diagram of FIG. 1 showing the basic arrangement of the image processor, indicated by 1 through 4 are input terminals of video signals, 5 through 8 are analog-to-digital (A/D) converters, 17 is a memory, 18 is a memory control circuit, 20 is a digital-to-analog (D/A) converter, and 21 is an output terminal.

The image processor has four video inputs, and these video signals A, B, C and D are received at the input terminals 1, 2, 3 and 4, respectively. The video signals A, B, C and D are converted into digital video signals by the respective A/D converters 5, 6, 7 and 8, and are stored in the memory 17 which is controlled by the memory control circuit 18.

In the memory 17, the digital video signals A, B, C and D are each written every other horizontal scanning line, with each intervening horizontal scanning line being removed, and stored in the specified areas. As shown in FIG. 2, the memory 17 has its column address and row address each split into two so that the whole 1-field area is divided into four areas, in which the digital video signals A, B, C and D are stored. Accordingly, an area A of the memory 17 stores the digital video signal A for one field, and in the same way areas B, C and D store the digital video signals B, C and D for one field, respectively.

The number of column addresses of each of the areas A, B, C and D in the memory 17 is made equal to the number of samples in one horizontal scanning period of the A/D converter 5, which has its sampling clock frequency made equal to the writing clock frequency of the memory 17.

The memory 17 is read at a reading clock frequency twice the writing clock frequency, and the whole storage address is read in the order of address in a period of field length. Assuming a number of column addresses of m and a number of row addresses of n, with the starting address being (0, 0) as shown in FIG. 2, the memory 17 is addressed for reading in the order of (0, 0), (1, 0), . . . , (m, 0), (0, 1), (0, 2), . . . , (0, n), (1, n), . . . ,(m, n). Reading of complete column addresses of one row takes a time of one horizontal scanning period.

The memory 17 stores the digital video signals A, B, C and D for one field in the specified areas, and at the same time its whole storage area is read out. Consequently, the digital video signals A, B, C and D read out of the memory 17 have each field compressed on the time axis.

The digital video signals read out of the memory 17 are converted into analog video signals by the D/A converter 20, and the signals are delivered to a monitor display (not shown) through the output terminal 21. On the monitor screen, the pictures carried by the video signals A, B, C and D are displayed in a 1/4 reduction size in four divided screen areas.

However, the foregoing prior art image processor has the following deficiencies.

The first problem is jitters caused by the clock. The memory 17 is addressed in time with the horizontal and vertical sync signals, and each address receives pixel data which is delayed by a certain time length from the horizontal sync signal of a horizontal scanning line at a certain position counted with respect to the vertical sync signal. In this case, if the A/D converters 5-6 have their sampling clock phase varied with respect to the horizontal sync signal, the sampling point of the video signals is shifted and incorrect pixels are sampled. Consequently, the memory 17 stores data which has been sampled at positions shifted from the specified positions based on the horizontal sync signal. In the conventional system, the sampling clock has its phase varied with respect to the horizontal sync signal as much as one sampling clock period. Reading out pixel data from the memory 17 to the monitor screen produces pictures in which all pixels are shifted in the horizontal direction, and since in the conventional system the A/D converters 5-8 have a relatively low sampling clock frequency, the horizontal displacement of displayed pictures is highly noticeable.

Especially, when the horizontal sync signals of the input video signals are out of phase with the sampling clock, each horizontal scanning line has a different shift in the horizontal direction, resulting in a display of notched vertical profiles and vertical lines. In order to prevent this defect, conventional systems have employed start oscillators controlled for stopping and starting in response to the horizontal sync signals or clock generators based on a PLL circuit or the like for producing clock signals as a multiple of the horizontal sync signals, thereby synchronizing the sampling clock signals of the A/D converters with the horizontal sync signals.

However, this technique necessitates individual clock generation circuits for all input video signals (A, B, C and D in FIG. 1), which unfavorably increases the circuit complexity and cost.

Another problem is the creation of a beat caused by the clock. Although the foregoing conventional image processor is operative for asynchronous input video signals A, B, C and D, this case results in asynchronous sampling clock signals for the A/D converters 5-8 and writing clock signals for the memory 17. These clock signals leak onto the video signal lines, although in a small degree, and the fluctuation of frequency or phase among the clocks creates a beat and eventually deteriorates the picture quality on the monitor screen.

This defect may be prevented by synchronizing all video signals so that a common clock is used. But such a modified system necessitates additional delay means and control means for the synchronization of video signals, resulting in an increased circuit complexity and cost.

An object of this invention is to solve the foregoing prior art deficiencies and provide an image processor capable of enhancing the picture quality without increasing the circuit complexity.

In order to achieve the above objective, the inventive image processor includes, for A/D conversion means of each video signal, a sync separation circuit which separates the sync signal from the video signal and a clock reduction circuit which is reset by the sync signal and adapted to reduce the clock frequency, with all clock reduction circuits of the A/D conversion means having an equal frequency reduction ratio and equal clock frequency, and the output signals of the clock reduction circuits being used as sampling clocks for A/D conversion.

Since the clock reduction circuit is reset by the sync signal, it produces a sampling clock with a phase difference, from the sync signal, of one input clock period of the clock reduction circuit at most, and it significantly reduces jitters as compared with the case of a sampling clock independent of the sync signal where the maximum phase difference is one sampling clock period. In addition, all A/D conversion means have an equal sampling clock frequency, and therefore beat is not created.

DESCRIPTION OF THE PREFERRED EMBODIMENTS

Embodiments of this invention will now be described with reference to the drawings.

Figure 1:
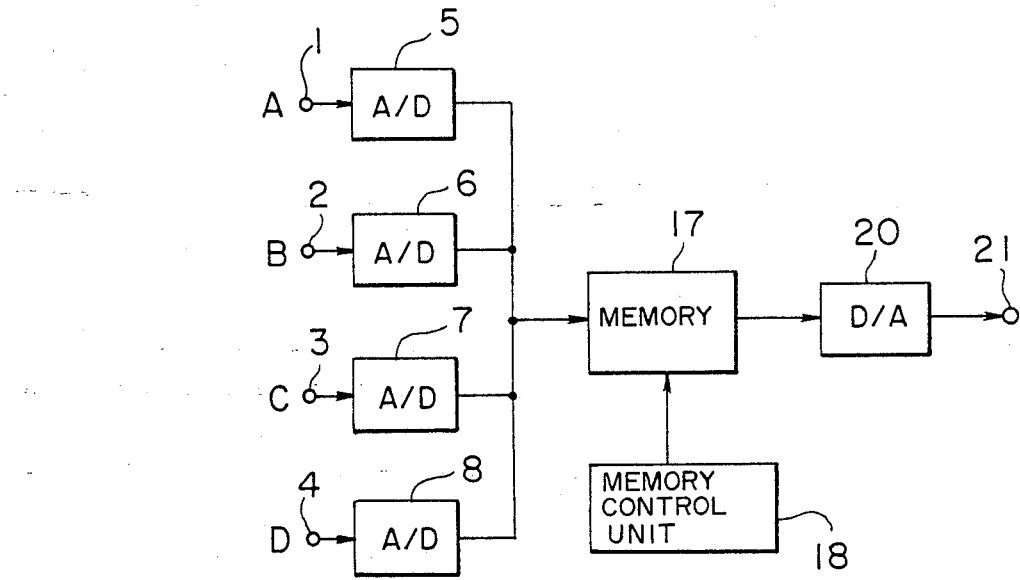
FIG. 1 is a block diagram showing, as an example, the principal portion of the conventional image processor.
Figure 2:
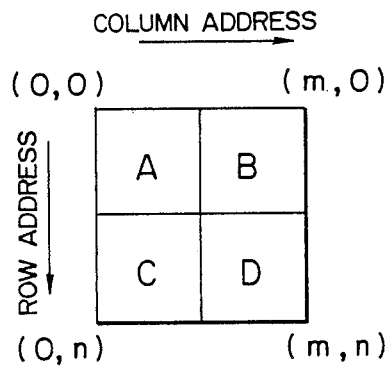
FIG. 2 is a diagram showing the storage areas of the memory in FIG. 1 for storing video signals.
Figure 3:
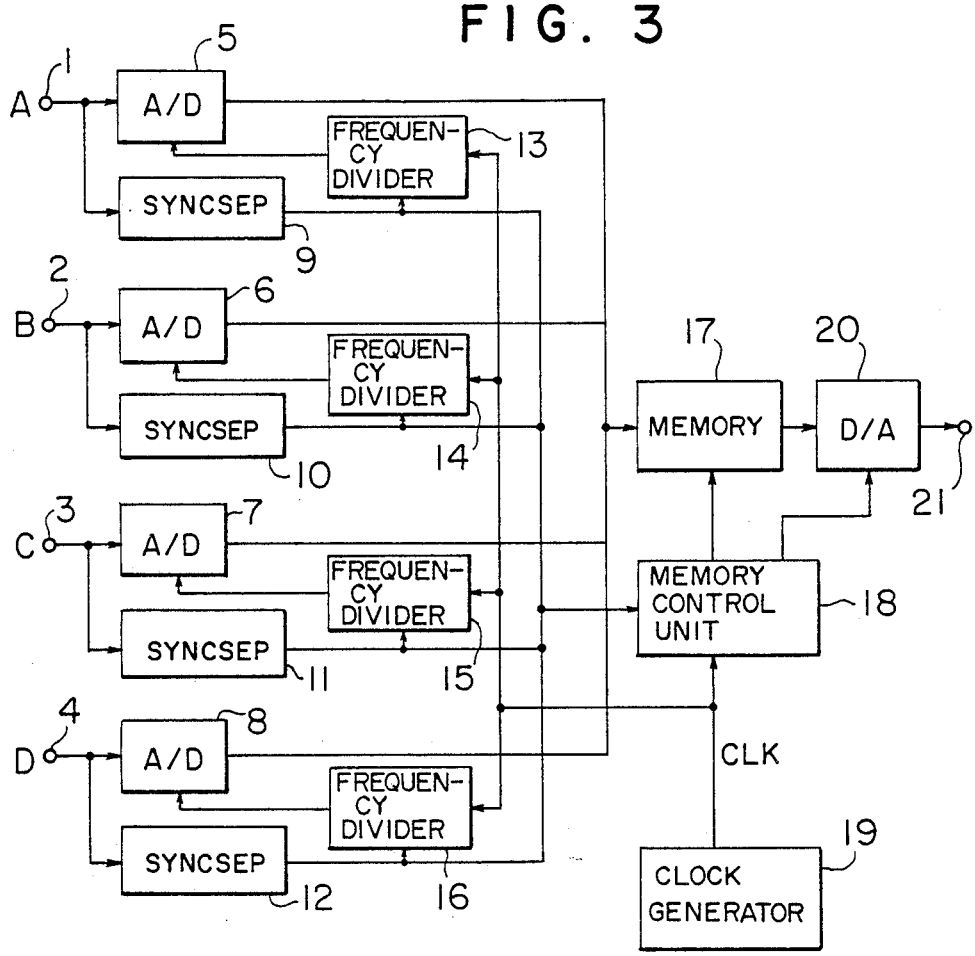
FIG. 3 is a block diagram showing the image processor embodying the present invention.

FIG. 3 is a block diagram showing an embodiment of the invention, in which indicated by 9 through 12 are sync separation circuits, 13 through 16 are frequency dividers, and 19 is a clock generator. Functional blocks identical to those shown in FIG. 1 are referred to by the same symbols and explanation thereof will not be repeated.

In the figure, the clock generator 19 includes a crystal oscillator and produces a reference clock CLK with a stabilized frequency, which is set higher than the sampling clock frequency for the A/D converters 5 through 8. In this embodiment, the sampling clock frequency is about 7 MHz, and the reference clock CLK is set to about 28 MHz, i.e., four times the sampling clock frequency. The reference clock CLK is supplied to the frequency dividers 13-16, each of which divides the frequency by four. The output of the frequency divider 13 is supplied to the A/D converter 5 as a sampling clock, and similarly the remaining frequency dividers 14, 15 and 16 have their outputs supplied as sampling clocks to the A/D converters 6, 7 and 8, respectively. Accordingly, the A/D converters 5-8 are supplied with sampling clocks of the equal frequency.

A video signal received on the input terminal 1 is fed to the A/D converter 5 so that it is converted into a digital video signal, while it is also fed to the sync separation circuit 9, by which the sync signal is extracted. The sync signal is supplied to the frequency divider 13 as a reset signal. The frequency divider 13 is reset during the active period of the sync signal, and thereafter it starts the frequency reduction operation for the reference clock CLK.

Figure 4:
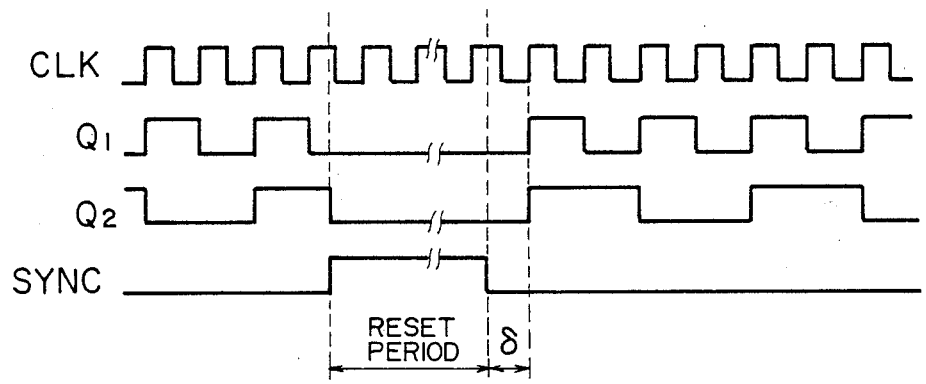
FIG. 4 is a timing chart used to explain the operation of the frequency dividers in FIG. 3.

The frequency reduction operation of the frequency divider 13 will be explained with reference to FIG. 4. The frequency divider 13 is a 2-stage- flip-flop circuit, for example, with the first-stage flip-flop producing an output Q1 by reducing the reference clock CLK by half. The second-stage flip-flop reduces the output Q1 by half to produce an output Q2. The output Q2 has a quarter frequency of the reference clock CLK and it is used as a sampling clock for the A/D converter 5 (FIG. 3).

Assuming the flip-flops make transitions at the rising edge of the input signal, the output Q2 has its transition edges timed to the rising edge of the reference clock CLK. With a sync signal SYNC being supplied to the frequency divider 13, the flip-flops are reset to have the output Q2 fixed to a low level during the active period of SYNC. After the sync signal SYNC has subsided, the circuit 13 is relieved of the reset state, and it produces a rising output Q2 at the first rising edge of the following reference clock CLK. The frequency division operation continues.

The output Q2 (sampling clock) after the reset period has a first rising edge with a delay o from the falling edge of the sync signal SYNC, which can be one period of the reference clock CLK, i.e.( a quarter period of the sampling clock, at most. Thus, in the where case sampling clock is completely independent of the sync signal, the sampling clock previously had a phase difference equal to one period of the sampling clock at most, whereas according to the embodiment of this invention the phase difference can be suppressed smaller than the quarter period of the sampling clock. As a result, the memory 17 receives, at each address, data of the virtually correct sampling point of the video signal A, whereby the displacement of the image on the monitor screen can be reduced significantly.

The remaining frequency dividers 14–16 function identically. They divide by four the reference clock CLK from the clock generator 19, while being reset by the respective sync signals in the video signals B, C and D, to produce sampling clocks whose phase difference from the sync signals is smaller than a quarter period of sampling clock.

This embodiment enables the use of the signal reference clock CLK from the clock generator 19, despite the asynchronous video signals A, B, C and D, to produce individual sampling clocks by merely adding the frequency dividers 13–16, whereby the circuit complexity does not increase significantly. Moreover, these sampling clocks have the same frequency and have their phase relationship fixed, whereby the system does not create a beat which deteriorates the quality of displayed pictures.

In FIG. 3, the memory control circuit 18 is supplied with the reference clock CLK and the sync signals from synchronizing circuits 9–12 so that the sampled data of the video signals A, B, C and D are addressed for writing in the memory 17. With the sampling clock frequency for the A/D converters 5–8 and writing clock frequency for the memory 17 being set to 7 MHz, as mentioned previously, the reading clock for the memory 17 is set to 14 MHz. By setting the reading clock frequency twice the writing clock frequency, the degree of jitters attributable to the phase difference between the sync signal and sampling clock is further reduced by one half. Namely, the sampling clock of 7 MHz creates jitters as follows:

$$1/7(MHz) \times \tfrac{1}{4} = 36 ns$$

Setting the reading clock frequency twice the writing clock frequency halves the jitters to 18 ns. Generally, jitters below 20 ns, as accomplished by this embodiment, are invisible.

In this embodiment, the degree of jitters decreases in proportion to the increase in the reference clock CLK frequency, but due to practical limitation frequency limitations it is chosen on a compromise basis according to required system performance.

Figure 5:
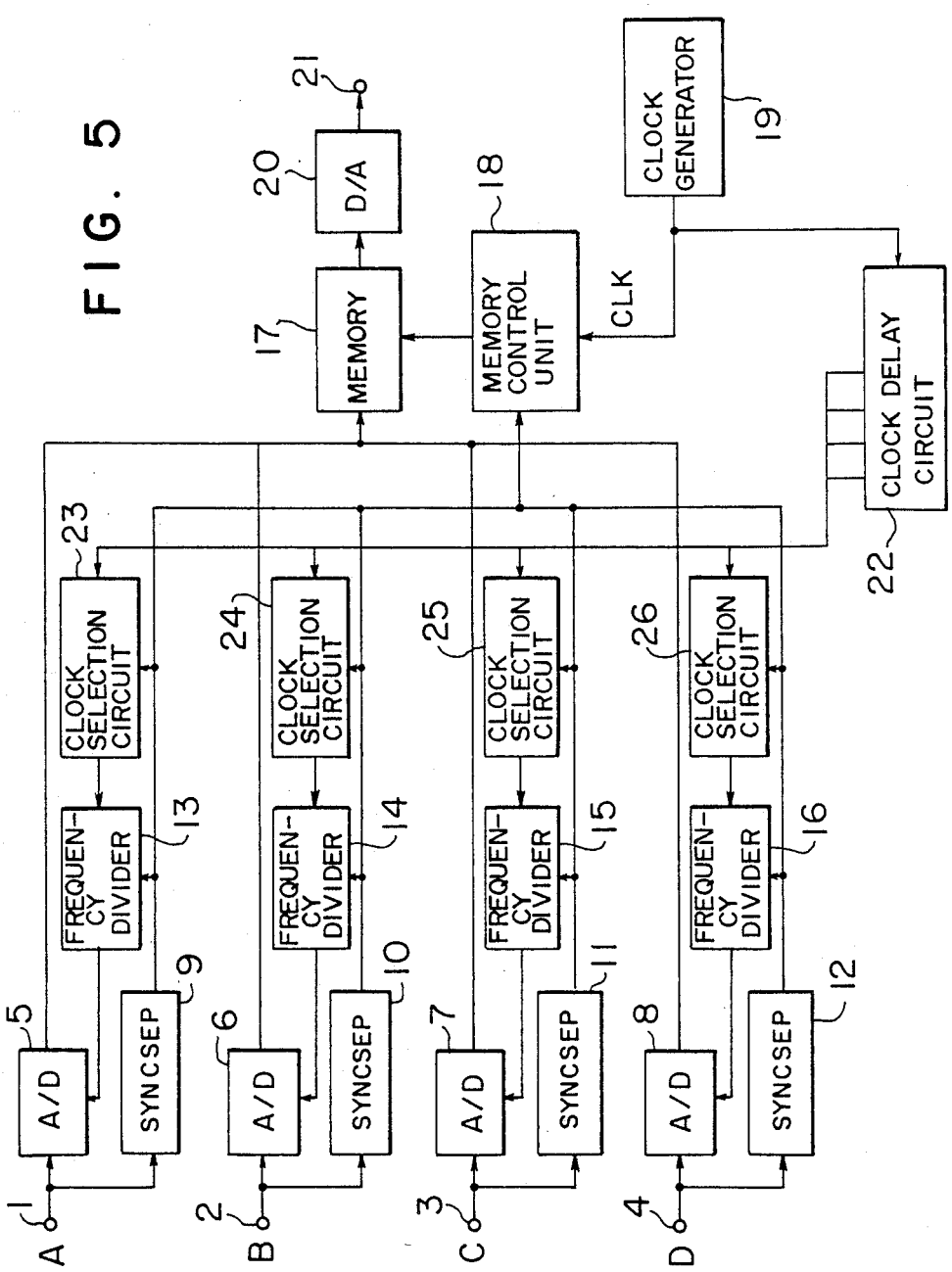
FIG. 5 is a block diagram showing another embodiment of the inventive image processor.

FIG. 5 is a block diagram showing another embodiment of the inventive image processor, in which indicated by 22 is a clock delay circuit, and 23 through 26 are clock selection circuits. Remaining components identical to those in FIG. 3 are referred to by the common symbols and explanation thereof will not be repeated.

In the figure, the reference clock CLK produced by the clock generator 19 is fed to the clock delay circuit 22, which produces four kinds of clocks shifted in phase sequentially by a quarter period of CLK. These clocks are supplied to the clock selection circuits 23-26, which include selected clocks with minimal phase differences from sync signals that are separated from the input video signals by the sync separation circuits 9-12. The selected clocks are supplied to the respective frequency dividers 13-16, which produce sampling clocks for the A/D converters 5-8 in the same manner as the preceding embodiment shown in FIG. 3.

Accordingly, the clock supplied to the frequency divider 13 has a minimized phase difference from the sync signal extracted by the sync separation circuit 9, and therefore jitters of the sampling clock for the A/D converter 5 are further minimized. The remaining sampling clocks for the A/D converters 6-8 are with the same affair.

Figure 6:
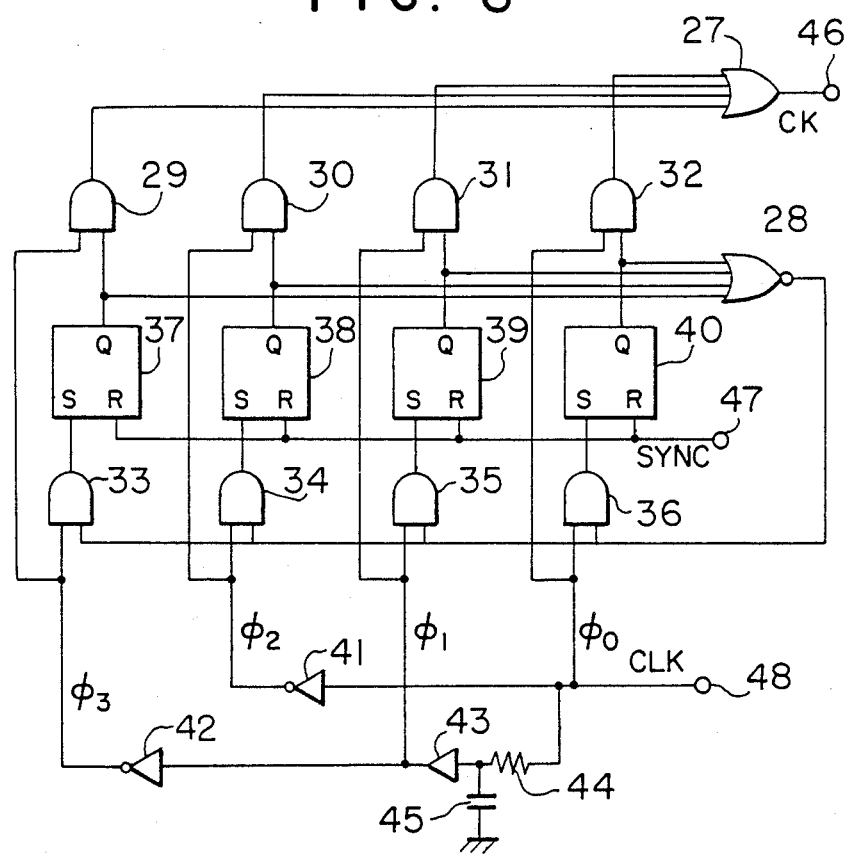
FIG. 6 is a schematic diagram showing a specific circuit arrangement of the clock delay circuit and clock selection circuits in FIG. 5.

FIG. 6 shows a specific circuit arrangement of the delay circuit 22 and clock selection circuits 23-26, in which indicated by 27 is an OR gate, 28 is a NOR gate, 29 through 36 are AND gates, 37 through 40 are SR-type flip-flops, 41 and 42 are inverters, 43 is an amplifier, 44 is a resistor, 45 is a capacitor, 46 is an output terminal, and 47 and 48 are input terminals.

In the figure, the inverters 41 and 42, amplifier 43, resistor 44 and capacitor 45 in combination constitute the clock delay circuit 22, in which the amplifier 43, resistor 44 and capacitor 45 in unison produce a delay of a quarter period of reference clock CLK. Shown in FIG. 6 is one of the clock selection circuits 23-26, e.g., 23, which is formed of the OR gate 27, NOR gate 28, AND gates 29-36, and flip-flops 37-40.

Figure 7:
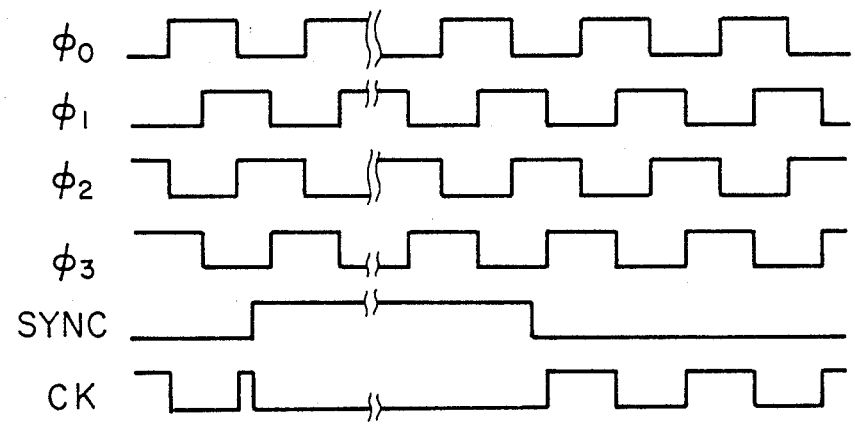
FIG. 7 is a timing chart used to explain the operation of the circuits shown in FIG. 6.

Next, the operation of the circuit will be explained with reference to FIG. 7, in which the signals are symbolized in the same manner as in FIG. 6. The input terminal 48 receives the reference clock CLK, and another input terminal 47 receives the sync signal SYNC. The sync signal SYNC is an active-high pulse. The reference clock CLK received on the input terminal 48 is renamed to be clock $\phi_0$ in the clock delay circuit. The clock $\phi_0$ is fed through the inverter 41, and a clock $\phi_2$ which lags from $\phi_0$ by a half period of CLK is produced. The reference clock $\phi_0$ (CLK) is delayed by the delay circuit made up of the amplifier 43, resistor 44 and capacitor 45, and a clock $\phi_1$ which lags from $\phi_0$ by a quarter period of CLK is produced. The clock $\phi_1$ is fed through the inverter 42, and a clock $\phi_3$ which lags from $\phi_0$ by a 3-quarter period of CLK is produced. Namely, these clocks $\phi_0$, $\phi_1$, $\phi_2$ and $\phi_3$ have the same frequency as the reference clock CLK and have their phases shifted sequentially by a quarter period of CLK. The clock $\phi_0$ is fed to the AND gates 32 and 36, the clock $\phi_1$ is fed to the AND gates 31 and 35, the clock $\phi_2$ is fed to the AND gates 30 and 34, and the clock $\phi_3$ is fed to the AND gates 29 and 33.

The sync signal SYNC received on the input terminal 47 is fed as a reset pulse to the SR-type flip-flops 37-40. The flip-flops 37-40 are reset to output low Q outputs during the active period of the sync signal SYNC. The Q outputs are applied to the corresponding AND gates 29-32 and to all inputs of the NOR gate 28. When all Q outputs are low, the NOR gate 28 issues a high output to the AND gates 33-36, and they are enabled.

Even after the sync signals SYNC has subsided, the flip-flops 37-40 remain producing low Q outputs, and accordingly the NOR gate continues to deliver a high output. In the absence of the sync signal SYNC, when a first clock is applied to any of the AND gates 33-36, e.g., the AND gate 33 receives the rising edge of the clock $\phi_2$ prior to the other AND gates 34-36, the AND gate 33 passes the rising clock to the flip-flop 37 as a set pulse. Then the flip-flop 37 is set, and it produces a high Q output.

Consequently, the AND gate 29 is enabled to pass the clock $\phi_3$, which is further fed through the OR gate 27 and output terminal 46 and delivered as a selected clock to the frequency divider 13 (FIG. 5).

In response to the high Q output of the flip-flop 37, the NOR gate 28 turns to produce a low output, and the AND gates 33-36 are disabled. Namely, immediately after the rising edge of the clock $\phi_3$ has passed through the AND gate 33, all AND gates 33-36 are disabled, thereby blocking the supply of clocks $\phi_0$-$\phi_3$ to the flip-flops 37-40. The flip-flop 37 has its Q output held high until the next sync signal SYNC is entered through the input terminal 47, and the clock $\phi_3$ is delivered through the output terminal 46 continuously.

If, in another case, the AND gate 34 first passes the rising edge of the clock $\phi_2$ after the sync signal SYNC has gone, the flip-flop 48 is set and the clock $\phi_2$ is selected. The same operation takes place for the selection of other clocks $\phi_1$ and $\phi_0$. The operation of the remaining clock selection circuits 24-26 is exactly identical to the foregoing example of circuit 23.

According to this embodiment, in which the clock delay circuit 22 is assumed to produce the clocks $\phi_0$-$\phi_3$ with a sequential phase shift of a quarter period, a clock selected by each of the clock selection circuits 23-26 is out of phase with the sync signal not in excess of a quarter period of the reference clock CLK, and accordingly, a sampling clock divided from the selected clock by each of the frequency dividers 13-16 is out of phase with the sync signal not in excess of a quarter period of the reference clock CLK. This means that jitters of sampling clock are smaller than a 1/16 period of the sampling clock, and it is equivalent to the preceding embodiment shown in FIG. 3 of the case where the reference clock CLK frequency is raised four times.

As described, this embodiment is capable of reducing jitters drastically without increasing the reference clock CLK frequency. The present invention is not confined to the specific values of parameters exemplified in the foregoing embodiments.

According to this invention, as described above, sampling clocks for A/D-converting asynchronous video signals can be produced from a single reference clock, and jitters of the sampling clocks relative to the respective video signals can be reduced drastically, whereby the degradation of displayed pictures caused by jitters and clock beats can be prevented without involving the increased circuit complexity. The circuit arrangement is primarily based on logic elements that are readily integrated and therefore is economically advantageous.

We claim:

1. An image processor which receives a plurality of input video signals and includes analog-to-digital conversion means for respectively converting the input video signals into digital video signals and a memory in which the digital video signals are written in storage areas which respectively correspond to the digital video signals and from which the digital video signals are read in order to provide a display to be displayed on a screen, said image processor comprising:
   sync separation circuits, respectively connected to said analog-to-digital conversion means, each for extracting a sync signal from a respective one of the input video signals; and
   frequency division circuits each having the same frequency reduction ratio respectively connected to receive and be reset by sync signals extracted from the input video signals by said sync separation circuits and which each divide the frequency of a clock signal applied thereto, said frequency division clocks producing sampling clock signals that are equivalent in frequency and supplying the sampling clock signals to said analog-to-digital conversion means for use in performing the analog-to-digital conversion on the input video signals.

2. An image processor which receives a plurality of input video signals and includes analog-to-digital conversion means for respectively converting the input video signals into digital video signals and a memory in which the digital video signals are written in storage areas which respectively correspond to the digital video signals and from which the digital video signals are read in order to provide a display to be displayed on a screen, said image processor comprising:
   sync separation circuits, respectively connected to said analog-to-digital conversion means, each for extracting a sync signal from a respective one of the input video signals;
   frequency division circuits each having the same frequency reduction ratio respectively connected to receive and be reset by sync signals extracted from the input video signals by said sync separation circuits and which each divide the frequency of a clock signal applied thereto, said frequency division clocks producing sampling clock signals that are equivalent in frequency and supplying the sampling clock signals to said analog-to-digital conversion means for use in performing the analog-to-digital conversion on the input video signals;
   clock selection circuits respectively provided for each of said analog-to-digital conversion means;
   a clock generation circuit for producing a reference clock signal; and
   a clock delay circuit which produces a plurality of clock signals from the reference clock signal which have the same frequency and different phases, each of said clock selection circuits selecting a clock signal from among the clock signals produced by said clock delay circuit which has a minimal phase difference with respect to a sync signal produced by a respective one of said sync separation circuits and supplying the selected clock signal to a respective one of said frequency division circuits.

3. An image processor according to claim 1, wherein the sampling clock signals are respectively applied to the analog-to-digital conversion means.

4. An image processor according to claim 1, wherein the frequency at which the digital video signals are written into the memory is equal to half the frequency at which the digital video signals are read out of the memory.

5. A video monitoring apparatus which receives a plurality of input video signals from a plurality of video cameras and includes analog-to-digital conversion means for respectively converting the input video signals into digital video signals and a memory in which the digital video signals are written in storage areas which respectively correspond to the digital video signals and from which the digital video signals are read for composing a plurality of moving images to be displayed on a screen, said video monitoring apparatus comprising:
   a reference clock generator for generating a reference clock having a predetermined period;
   sync separation circuits, respectively connected to said analog-to-digital conversion means, each for extracting a sync signal from a respective one of the input video signals; and
   frequency division circuits each having the same frequency reduction ratio respectively connected to receive the sync signals and to respectively perform frequency division resets in response to the sync signals and which each perform frequency division on the reference clock, said frequency division circuits producing sampling clock signals that are equivalent in frequency and supplying the sampling clock signals to said analog-to-digital conversion means for use in performing the analog-to-digital conversion on the input video signals.

6. A video monitoring apparatus according to claim 5, further comprising:
   clock selection circuits respectively provided for each of said analog-to-digital conversion means; and
   a clock delay circuit which produces a plurality of clock signals from the reference clock which have the same frequency and different phases, each of said clock selection circuits selecting a clock signal from among the clock signals produced by said clock delay circuit which has a minimal phase difference with respect to a sync signal produced by a respective one of said sync separation circuits and supplying the selected clock signal to a respective one of the frequency division circuits.

7. An image processor according to claim 1, wherein the clock signal applied to said frequency division circuits is a reference clock signal produced by a single clock generation circuit.

* * * * *

UNITED STATES PATENT AND TRADEMARK OFFICE
CERTIFICATE OF CORRECTION

PATENT NO. : 4,970,588
DATED : November 13, 1990
INVENTOR(S) : Kobayashi

It is certified that error appears in the above-identified patent and that said Letters Patent is hereby corrected as shown below:

In the left-hand column of page 1, line 2, "Kobayashi" should read --Kobayashi et al.--; line 5, after "Inventor: Jun Kobayashi, Katsuta, Japan" insert --, Kiyoshi Onoda, Aichi-gun, Aichi-ken, Japan-- .

Signed and Sealed this

Second Day of June, 1992

Attest:

DOUGLAS B. COMER

Attesting Officer

Acting Commissioner of Patents and Trademarks